(12) United States Patent
Vick et al.

(10) Patent No.: US 6,454,275 B1
(45) Date of Patent: Sep. 24, 2002

(54) CASE SEAL

(75) Inventors: Christian Vick, Winsen; Sellmann Dieter, Hamburg, both of (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/424,782

(22) PCT Filed: May 29, 1998

(86) PCT No.: PCT/EP98/03208

§ 371 (c)(1),
(2), (4) Date: Jan. 28, 2000

(87) PCT Pub. No.: WO98/54457

PCT Pub. Date: Dec. 3, 1998

(30) Foreign Application Priority Data

May 30, 1997 (DE) .......................................... 197 22 629

(51) Int. Cl.$^7$ ................................................. F16J 15/52
(52) U.S. Cl. ........................................................ 277/634
(58) Field of Search ................................ 277/551, 634, 277/906, 907; 384/119, 282

(56) References Cited

U.S. PATENT DOCUMENTS

| 2,945,715 A |   | 7/1960  | Burrell         |
|-------------|---|---------|-----------------|
| 4,362,341 A |   | 12/1982 | Nissan          |
| 4,383,719 A | * | 5/1983  | Matzelle        |
| 4,394,853 A |   | 7/1983  | Lopez-Crevillen |
| 4,434,756 A |   | 3/1984  | Nilsson et al.  |
| 4,763,619 A | * | 8/1988  | Eitel           |
| 4,974,973 A |   | 12/1990 | Janeke          |
| 5,536,023 A |   | 7/1996  | Surbrook et al. |
| 5,549,394 A | * | 8/1996  | Nowak et al.    |
| 5,988,888 A | * | 11/1999 | Une et al.      |

FOREIGN PATENT DOCUMENTS

| DE | 22 03 485     | 8/1972  |
| DE | 38 41 203 A1  | 6/1990  |
| DE | 41 36 890 A1  | 5/1993  |
| DE | 4311257       | 10/1994 |
| DE | 43 11 257 A1  | 10/1994 |

OTHER PUBLICATIONS

Patent Abstracts Of Japan, Dec. 1995, re JP 07317906 A.

* cited by examiner

Primary Examiner—Robert J. Sandy
Assistant Examiner—Karlena Schwig
(74) Attorney, Agent, or Firm—Pillsbury Winthrop LLP

(57) ABSTRACT

The invention relates to a case seal (6) for cross-divided crank cases, comprising an upper section (1) and a lower shell (2) (see figure). Both halves of the crank case have bearing seats (3, 4) for bearing (5) a shaft. The inventive case seal (6) is characterized in that it is configured as a single-piece elastic shaped part which can be placed on one half of a crank case along the sealing surfaces (7, 8) and the bearing seats (3, 4). Preferably, the case seal also consists of a second elastic shaped part (11) which can be inserted into the bearing seat (3) of the second half (1) of the crank case that is not provided with the first sealing part (6).

12 Claims, 3 Drawing Sheets

CASE SEAL

FIELD OF THE INVENTION

The invention relates to a case seal for transversely-divided crankcases.

BACKGROUND OF THE INVENTION

Many engines have transversely-divided crankcases. Transversely-divided crankcases can be found in particular on small two-cycle engines, such as are used for motor-driven hand tools.

Such crankcases have an upper crankcase element, which is associated with the cylinder, and a lower crankcase shell. For assembly, the piston, connecting rod and the crankshaft, together with bearings and shaft seals, are inserted into the upper crankcase element, and thereafter the crankcase is closed by means of the lower crankcase shell.

Both crankcase halves have bearing seats, into which the bearings of the crankshaft are inserted. Roller bearings, which must be securely maintained in the bearing seats, are mostly used in connection with small two-cycle engines. It must be assured that the bearings cannot become twisted in the bearing seats and are arranged, exactly placed in respect to the cylinder track, in the crankcase half assigned to the cylinder.

Furthermore, the separating line between the two case halves must be sealed. Sealing is important, in particular in the case of two-cycle engines, so that the crankcase pressures required for the gas exchange can be assured. When assembling the crankcase it is therefore necessary to make sure at the same time that the bearings are held in place with the required force without being firmly clamped, that the bearings are correctly positioned, and that the required sealing effect at the crankcase separating line is achieved at the same time.

Liquid sealing material is mostly used for sealing the crankcase separating line. With the crankcase closed, the bearing seats must exert a defined force on the bearing for fixing them in place, wherein it is necessary at the same time to close the crankcase separating line in such an exact manner-that a sufficient sealing effect is achieved with the liquid sealing material. It is also possible to employ a thin paper seal alternatively with the liquid sealing material. However, the size of the seal must be matched to the size of the separating line, so that the bearings are sufficiently fixed in place.

Components and surfaces exactly matched to each other, as well as careful assembly, are prerequisites for the trouble-free operation of the engine. Leaks in the transition area between the housing gap and the bearing seats often occur, in particular, with the conventional solution of the problem. Further than that, positional inaccuracies of the bearing seats lead to damage to the crankshaft. Bearing damage often also occurs as a result of inaccurate bearing seats because of twisting of the bearings in the course of screwing the crankcase together.

SUMMARY OF THE INVENTION

It is therefore the object of the invention to make a case seal available, which provides a dependable seal between the two case halves, in particular in the transition area between the housing gap and the bearing seats, and which at the same time makes possible a simple and dependable seating of the crankshaft bearings in the bearing seats in the case, as well as a sufficient positioning of the crankshaft in respect to the cylinder track. It is intended in particular that for achieving a cost-effective production, machining of the bearing seats should be omitted and a rapid assembly be made possible.

To attain this object, a case seal for transversely-divided crankcases composed of an upper crankcase element and a lower crankcase shell is proposed, wherein both case halves have bearing seats for seating a shaft, which is distinguished in that the case seal is designed as a one-piece resilient molded element, which can be placed on one crankcase half along the sealing faces and the bearing seats.

Such a case seal is produced as a molded element, which is placed on the sealing faces and the faces of the bearing seats of one crankcase half.

The seal can preferably be embodied in such a way that it also runs along the seats of the shaft seal rings of a crankshaft half. It can be shaped in such a way that it can be placed either on the lower crankcase element or on the upper crankcase element.

The crankcase bearings can also be inserted into non-machined bearing seats in the crankcase. The crankcase bearings are pressed with a defined force into their bearing seats in the oppositely located crankcase half. Turning of the crankcase bearings along with the shaft is reduced, production tolerances in the area of the machined or non-machined sealing faces, the bearing seats and the shaft seal rings, are compensated by the resilient seal.

It is achieved at the same time that a dependable sealing effect is assured along the crankcase separating line.

The radial seal of the shaft is provided in the customary manner by means of a shaft seal ring. Thus, the case seal performs a sealing function in the area of the crankcase separating line, while in the area of the bearing seats it provides a dependable seating for the shaft bearings, or respectively for the crankshaft.

If the seal also extends along the shaft seal seats, it can compensate production tolerances here and improve the sealing effect.

A rubber material which must be gasoline- and oil-resistant is preferably selected for the resilient molded element.

In a further development of the invention the crankshaft half on which the seal is intended to be placed is provided with a groove in the area of the crankshaft separating line, into which the molded sealing element can be at least partially inserted. In the course of fastening the lower crankshaft shell on the upper crankshaft element, the seal is squeezed into the groove and a dependable sealing effect is assured.

Another further development of the invention provides that the bearing seats, the shaft seal ring seats, or both the bearing seat as well as the shaft seal seats, of the second crankshaft half, which is not provided with a seal, are at least partially rubber-coated. By means of this it is achieved that the bearings are additionally secured against twisting, and production tolerances are compensated. The sealing effect of the shaft seal rings is being improved.

For improving the seating of the crankshaft bearings in the bearing seats, as well as the sealing of the crankcase, the seal can additionally consist of a second resilient molded element, which can be placed into the bearing seat and/or the shaft seal ring seat of the second crankcase half, or can additionally be placed along the sealing face of the second crankcase half. The second sealing element can also correspond in its shape to the first sealing element or, with an appropriately shaped crankcase, can be outwardly identical with the first element. This helps to lower the production costs and to prevent assembly errors.

The crankshaft bearings are then completely enclosed in resilient material, which fixes them in place in the bearing seats by means of a defined pressure, positions them and protects them from twisting, and compensates tolerances as well.

The same as the first element, the second element of the seal can be made of rubber. It can also be connected in one piece with the first element.

The advantage of the case seal in accordance with the invention is that elaborate machining of the bearing seats in the crankcase halves can be avoided. The production tolerances are compensated by the resilient molded elements. The seal is squeezed to a defined extent by the predetermined defined spacing between the crankcase halves, and at the same time the crankshaft bearings are held in place in the seats by a defined pre-stress.

Moreover, the use of liquid sealing material is no longer required. An efficient, cost-saving, clean manufacture is made possible. The seal can be prefabricated in one piece. Assembly errors and inaccuracies, which later lead to leaks in the engine, are impossible.

BRIEF DESCRIPTION OF THE DRAWINGS

An exemplary embodiment of the invention will be described in greater detail in what follows by means of the attached drawings.

DETAILED DESCRIPTION OF THE PREFERRED EMBODIMENTS

Figure 1:
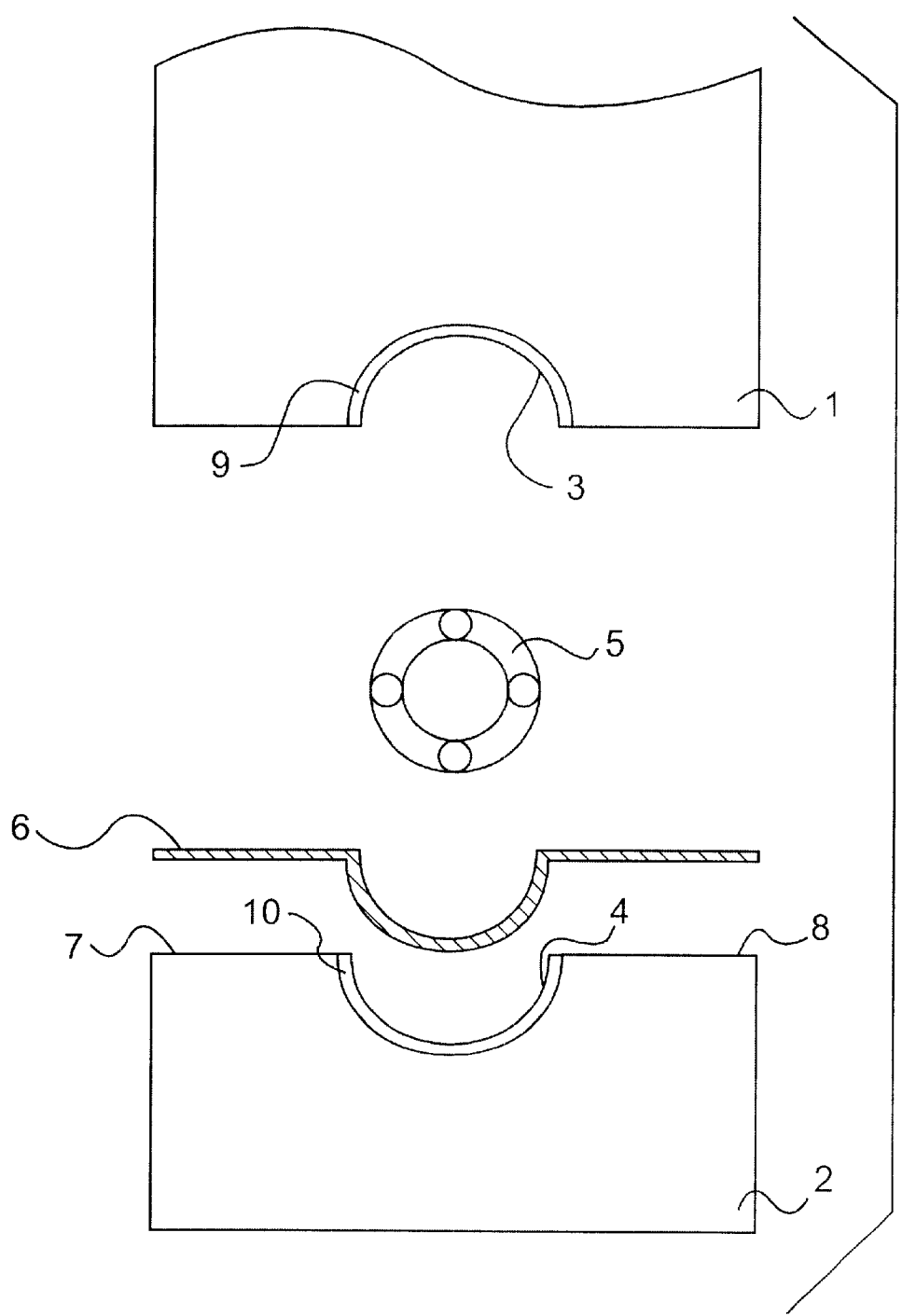
FIG. 1 schematically represents the crankcase of an engine with an embodiment of a seal in accordance with the invention, FIG. 2 also schematically represents another embodiment of the seal.

An engine is schematically represented in FIG. 1, whose crankcase consists of an upper crankcase element 1 and a lower crankcase shell 2. Seats 3, 4 for the crankshaft bearings 5, as well as shaft seal ring seats 9, 10 for the shaft seal ring, not represented, are provided in the upper crankshaft element, as well as in the lower crankcase shell 2. For assembly, first the piston, not represented, with the connecting rod, not represented, is mounted in the upper crankcase element 1, and the crankshaft, also not represented, with its bearing 5 and the shaft seal ring are inserted into the non-machined bearing seat 3 in the upper crankshaft element 1. Thereafter, a molded rubber element 6 is placed on the lower crankshaft shell 2. The molded rubber element 6 extends along the sealing faces 7, 8 of the crankshaft separating line, as well as along the bearing seat 4 and the shaft seal ring seat 10 in the lower crankcase shell 2. The lower crankcase shell 2 is then screwed together with the upper crankcase element 1. The molded rubber element 6 is slightly squeezed. In the process, the crankshaft bearing 5 is pressed in a defined manner against the crankshaft bearing seat 3 in the upper crankshaft element 1. The crankshaft bearing 5 is secured against twisting by means of the molded rubber element 6. An assured sealing of the case is achieved in the areas 7 and 8 along the sealing faces of the crankshaft separating line because of the squeezing of the molded rubber element. The sealing effect is additionally improved in that a circumferential groove is provided along the sealing faces 7, 8 in the lower crankshaft shell 2.

The radial seal of the crankshaft is provided by a conventional shaft seal ring, which is pressed into a seat 9, 10 ahead of the crankshaft bearing. The sealing effect of the shaft seal ring is improved in that the case seal also extends along the shaft seal ring seat 10 in the lower crankshaft shell 2. Production tolerances are compensated by this, and the shaft seal ring is maintained securely in its position.

Figure 2:
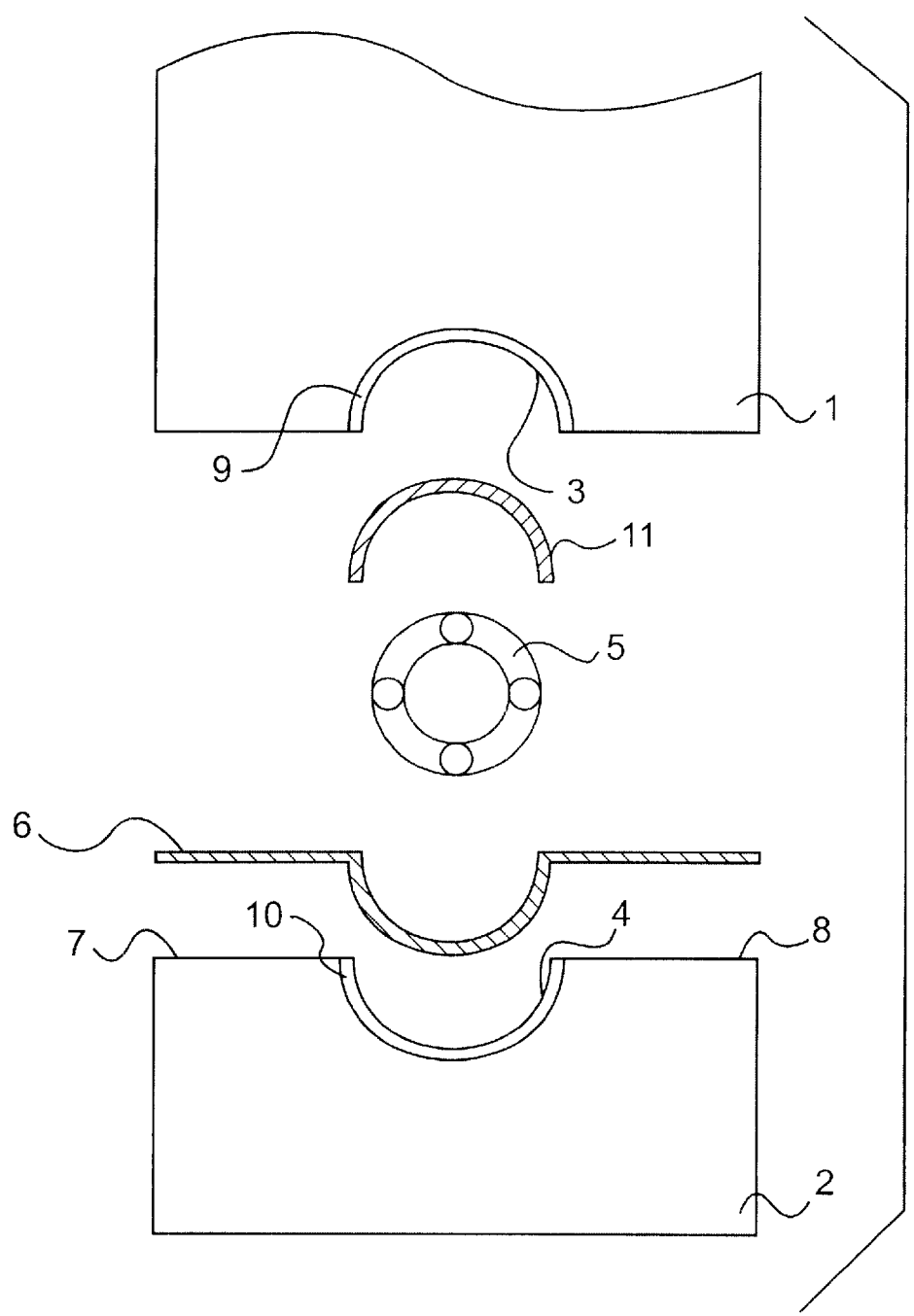

An embodiment of the case seal in accordance with the invention is schematically represented in FIG. 2, wherein a second molded element 11 can be introduced into the bearing seat 3 and the shaft seal ring seat 9 of the upper crankshaft element 1. Because of this, the crankshaft bearing 5 and the shaft seal ring are completely surrounded by a resilient sealing material on the exterior, by means of which the above described positive effects are even more improved.

Figure 3:
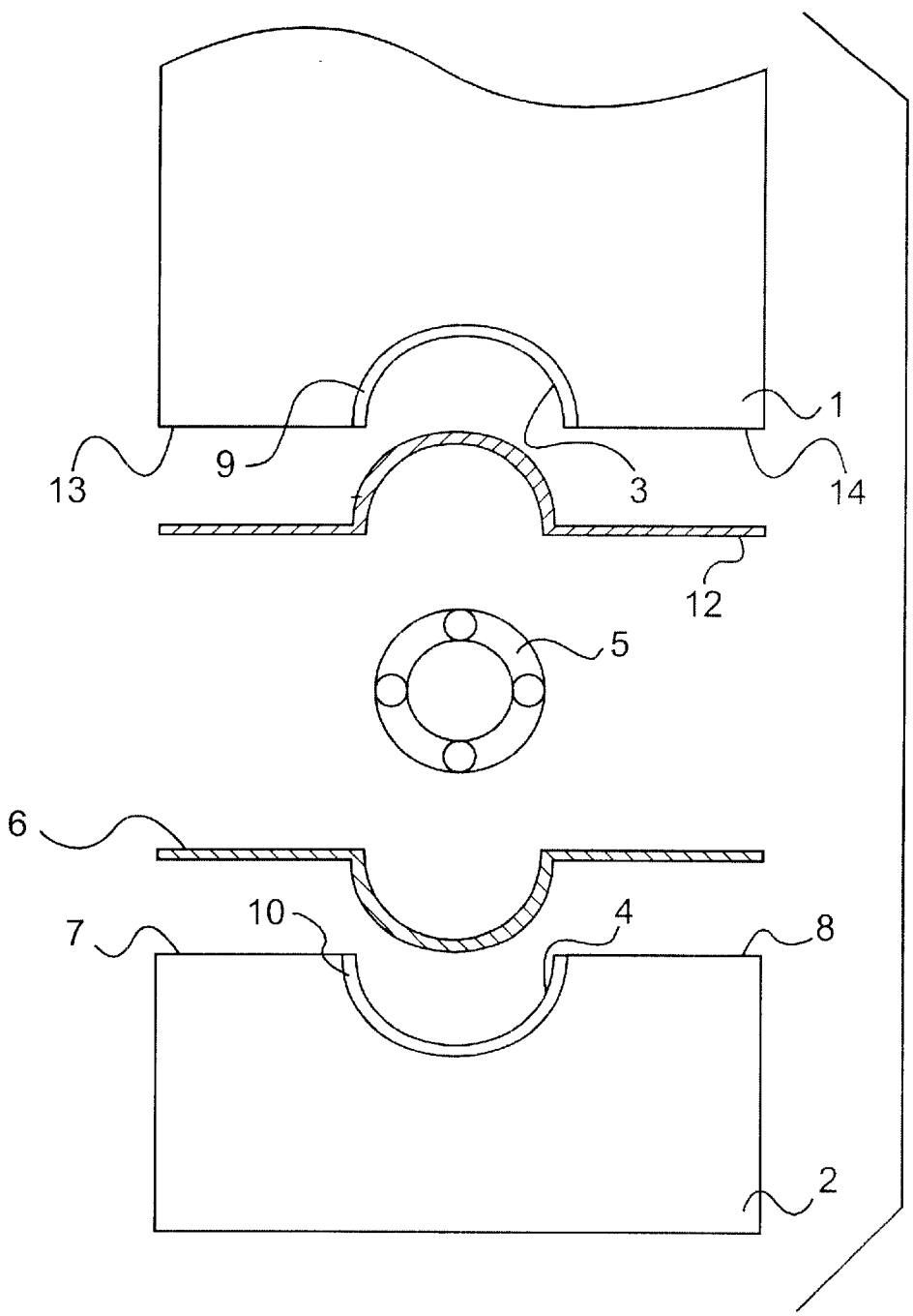
FIG. 3 shows a third embodiment of the seal in accordance with the invention.

An embodiment of the case seal is represented in FIG. 3, wherein the second sealing element 12 coincides with the first, 6. The crankcase of the represented engine is shaped in such a way, that a molded seal element 6, 12 can be placed on the upper crankcase element 1, as well as on the lower crankcase shell 2. In this way assembly errors because of wrongly matched sealing elements are made impossible. The compensation possibilities in regard to production tolerances or surface errors because of non-machined sealing and bearing faces are further improved by the double seal layer in the area of the sealing faces 7, 13, 8, 14.

What is claimed is:

1. A sealing arrangement for an engine having an upper crankcase assembly and a lower crankcase assembly, wherein the upper crankcase assembly includes an upper support seat for supporting a crankshaft support, wherein the lower crankcase assembly includes a lower support seat for supporting the crankshaft support, wherein at least one of the upper crankcase assembly and the lower crankcase assembly includes a sealing surface, the sealing arrangement comprising:

at least one case seal having a first portion located between the crankshaft support and one of the upper support seat and the lower support seat and a second portion positioned on the sealing surface, whereby the second portion is sandwiched between the upper crankcase assembly and the lower crankcase assembly, wherein at least one case seal engages the crankshaft support to prevent rotation of the crankshaft support with respect to the upper crankcase assembly and the lower crankcase assembly.

2. The sealing arrangement according to claim 1, wherein the least one case seal is formed rubber.

3. The sealing arrangement according to claim 2, wherein the at least one case seal is vulcanized onto at least one of the upper crankcase assembly and the lower crankcase assembly.

4. The sealing arrangement according to claim 2, wherein the least one case seal is molded as a single unit.

5. The sealing arrangement according to claim 1, wherein the at least one case seal comprises:

a first case seal having a first portion located between the crankshaft support and the lower support seat and a second portion positioned on a sealing surface of the lower crankcase assembly; and a second case seal having a first portion located between the crankshaft support and the upper support seat and a second portion positioned on a sealing surface of the upper crankcase assembly.

6. The sealing arrangement according to claim 3, wherein the first case seal and the second case seal engage the crankshaft support to prevent rotation of the crankshaft support with respect to the upper crankcase assembly and the lower crankcase assembly.

7. The sealing arrangement according to claim 3, wherein at least a portion of the first case seal and the second case seal is vulcanized onto at least one of the upper crankcase assembly and the lower crankcase assembly.

8. The sealing arrangement according to claim 3, wherein the first case seal and the second case seal are formed as a single unit.

9. The sealing arrangement according to claim 1, the at least one case seal comprises:

a first case seal having a first portion located between the crankshaft support and one of the upper support seat and the lower support seat and a second portion positioned on the sealing surface, whereby the second portion is sandwiched between the upper crankcase assembly and the lower crankcase assembly; and a second case seal having at least a first portion located between the crankshaft support and the other of the upper support seat and the lower support seat.

10. The sealing arrangement according to claim 9, wherein the first case seal and the second case seal engage the crankshaft support to prevent rotation of the crankshaft support with respect to the upper crankcase assembly and the lower crankcase assembly.

11. The sealing arrangement according to claim 9, wherein at least a portion of the first case seal and the second case seal is vulcanized onto at least one of the upper crankcase assembly and the lower crankcase assembly.

12. The sealing arrangement according to claim 9, wherein the first case seal and the second case seal are formed as a single unit.

* * * * *

UNITED STATES PATENT AND TRADEMARK OFFICE
CERTIFICATE OF CORRECTION

PATENT NO.    : 6,454,275 B1
DATED         : September 24, 2002
INVENTOR(S)   : Vick et al.

It is certified that error appears in the above-identified patent and that said Letters Patent is hereby corrected as shown below:

<u>Title page,</u>
Item [75], Inventors, should read
-- [75]  Inventors:     Christian Vick, Winsen; Dieter Sellmann, Hamburg, both of (DE) --

Signed and Sealed this

Twenty-seventh Day of April, 2004

JON W. DUDAS
*Acting Director of the United States Patent and Trademark Office*